May 14, 1935. O. E. RHODES ET AL 2,001,111
MOTOR MOUNTING
Filed Feb. 7, 1934
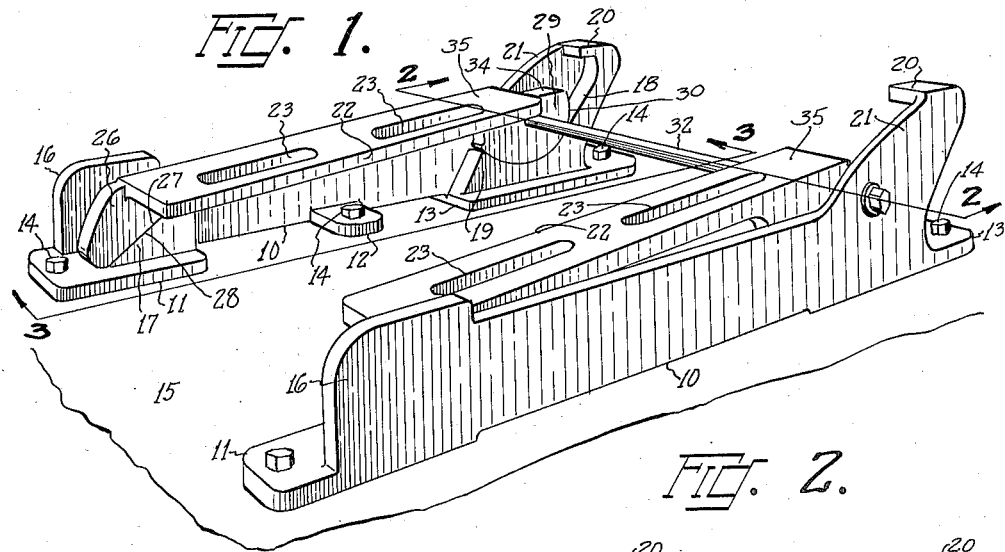
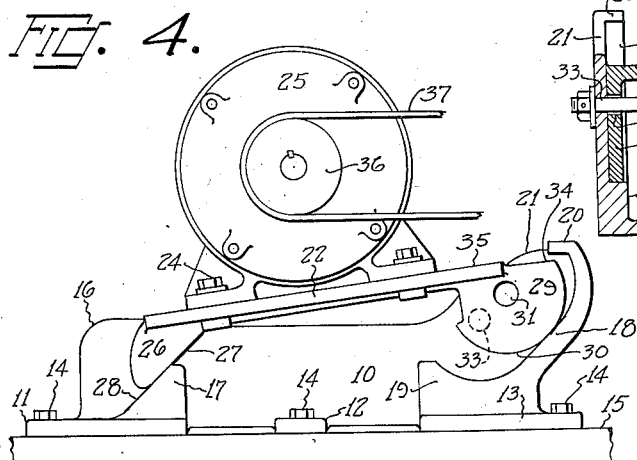
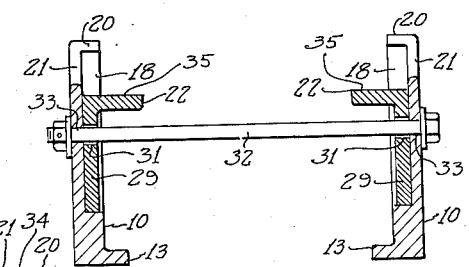
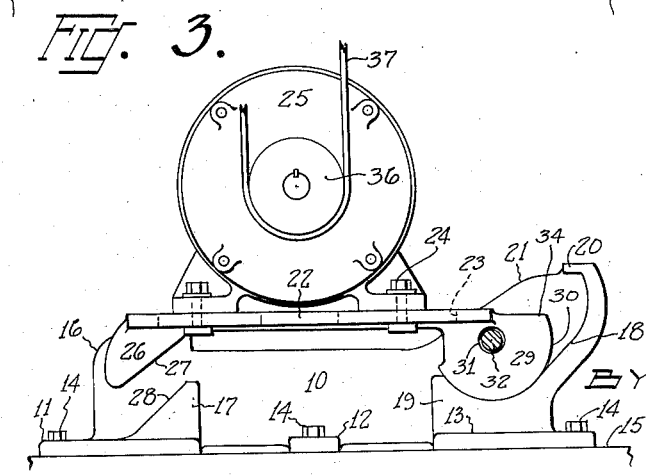
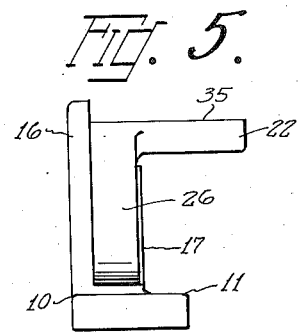
INVENTORS
O. E. RHODES.
F. L. ROCKWELL.
ATTORNEY Patented May 14, 1935

2,001,111

UNITED STATES PATENT OFFICE 2,001,111

MOTOR MOUNTING

Omer E. Rhodes, Aberdeen, and Frank L. Rockwell, Cosmopolis, Wash.

Application February 7, 1934, Serial No. 710,114

2 Claims. (Cl. 248—15)

This invention relates generally to electric motors and particularly to a mounting therefor.

The main object of this invention resides in the formation of an improved form of motor mounting especially adapted for use in connection with motors of one horse power or less, and is equally adaptable to vertical or horizontal drives.

The second object is to provide a simple form of motor mounting which will automatically maintain a fixed tension on the belt driven by the motor mounted thereon.

The third object is to construct a form of motor mounting which will expedite the moving of a motor from one machine to another without a careful resetting in each instance.

These and other objects will become more apparent in the specification following as illustrated in the accompanying drawing, in which:

Fig. 1 is a perspective view of the mounting ready to mount a motor thereon.

Fig. 2 is a section taken along the line 2—2 in Fig. 1.

Fig. 3 is a section taken along the line 3—3 in Fig. 1, showing same used in connection with a vertical drive.

Fig. 4 is a view similar to Fig. 3, but showing the mounting in a position having a horizontal drive.

Fig. 5 is an end elevation of one of the sections of the mounting.

Referring in detail to the drawing, there is shown a pair of spaced base plates 10 having inturned feet 11, 12, and 13 through which may be inserted the screws 14 by means of which the base plates 10 are rigidly secured to a floor or base 15.

In the angle formed between the portion 16 of each base plate 10 and adjacent foot 11 is formed a ramp 17. A corresponding ramp 18 is formed about the foot 13 except that the lower end 19 of the ramp 18 is curved upwardly while the upward end 20 of the ramp 18 turns backwardly into a substantially horizontal plane to form a stop. The portion 21 of the base 10 is carried upwardly to the end 20. On the inner side of each base plate 10 is disposed a longitudinally slotted bar 22 whose slots 23 receive the bolts 24 which fasten the motor 25 in position.

On the underside of the bar 22 is formed a downturned lug 26 whose inclined face 27 conforms with the inclined face 28 of the ramp 17. At the opposite end of each bar 22 is formed a downturned lug 29 whose underside 30 is an arc struck from the center of the hole 31 which is adapted to receive the bolt 32 which passes through corresponding holes 33 in both of the base plates 10. The top side 34 of each lug 29 is substantially parallel with the top surface 35 of the bar 22. The motor 25 is provided with a belt pulley 36. In Fig. 3 the drive belt 37 extends upwardly from the pulley 36. In Fig. 4 the drive belt 37 extends horizontally from the pulley 36 and in the direction of the end 20.

The operation of the device is as follows. Assuming that the parts are secured in position as shown in Fig. 1, and it is desired to mount a motor for a vertical drive as shown in Fig. 3. The bolt 32 is first withdrawn and the top side 34 is placed under the ends 20, and the belt 36 put in place. The lug 29 is then moved downwardly until the holes 21 register with the holes 33, and the bolt 32 is re-inserted and secured.

The weight of the motor 25 provides the necessary tension for the belt 37, and this tension can be regulated by the position of the bolts 24 in the slots 23. That is the nearer the motor shaft is to the vertical center line which passes through the bolt 32 the less tension will be on the belt 37.

If, however, the horizontal drive is to be employed, it is only necessary to withdraw the bolt 32 and permit the weight of the motor 25 and bars 22 to cause them to slide downwardly along the ramps 17 and 18.

While the details of construction may be varied considerably, it is not our intention to limit ourselves to this particular construction, and we intend to be bound only by the limits of the following claims.

We claim:

1. A motor mounting comprising a pair of base plates having means for securing same to a support, each of said plates having ramps formed on one side thereof, slotted motor supporting bars provided with inclined surfaces on the underside thereof which engage said ramps, the ramps of one end of said mounting having inturned stops formed at the upper end thereof and having horizontal openings formed through the upright portion of the base plates about the ramps adjacent to said stops, each of said slotted bars having a corresponding opening therein to receive a bolt extending across both of said face plate members.

2. A motor mounting consisting of a base member having a plurality of ramps disposed thereon, slotted motor mounting plates having downturned and inclined lugs formed thereon adapted to engage the inclined surfaces of said ramps and to slide thereon in a manner to provide a parallel movement at the line of motor fastening, and a removable bolt extending through one end of said base and through the downturned lugs of said slotted plates.

OMER E. RHODES.
FRANK L. ROCKWELL.